Figure 1:
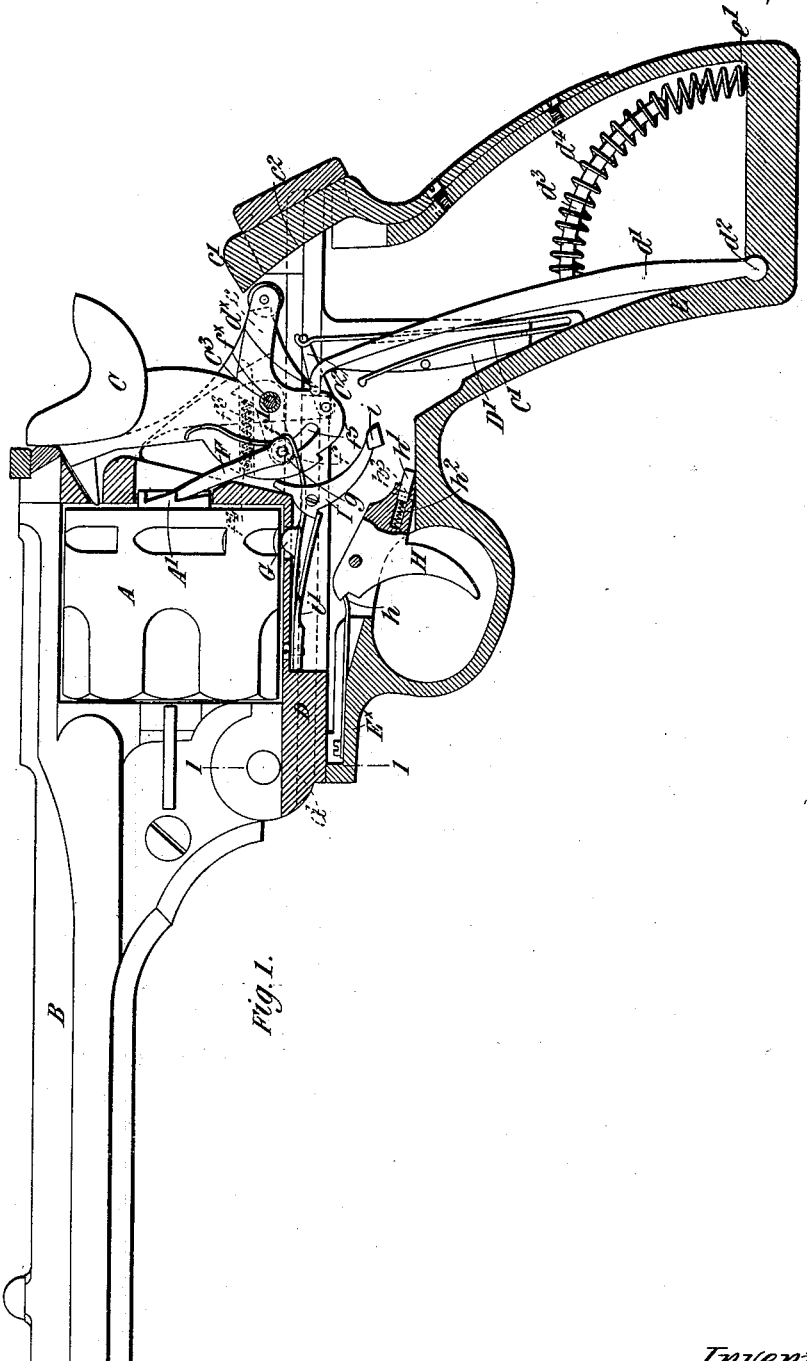

(No Model.)　　　　　G. V. FOSBERY.　　　5 Sheets—Sheet 1.
RECOIL OPERATED FIREARM.

No. 584,631.　　　　　　　Patented June 15, 1897.

Witnesses
R. D. Johnston Jr.
Robert Everett.

Inventor.
George V. Fosbery,
By James L. Norris
Atty.

(No Model.)

G. V. FOSBERY.
RECOIL OPERATED FIREARM.

No. 584,631.

5 Sheets—Sheet 2.

Patented June 15, 1897.

Witnesses,
R. D. Johnston Jr.
Robert Everett

Inventor
George V. Fosbery.
By James L. Norris.
Atty.

(No Model.) 5 Sheets—Sheet 3.
G. V. FOSBERY.
RECOIL OPERATED FIREARM.
No. 584,631. Patented June 15, 1897.
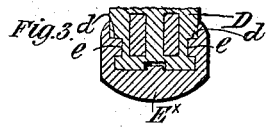
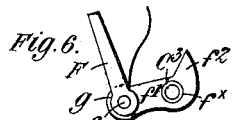
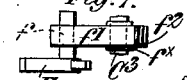
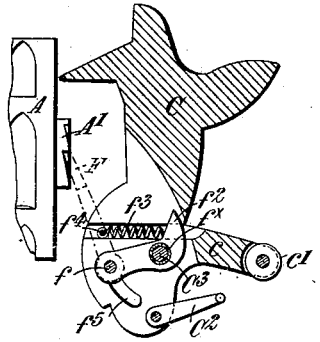
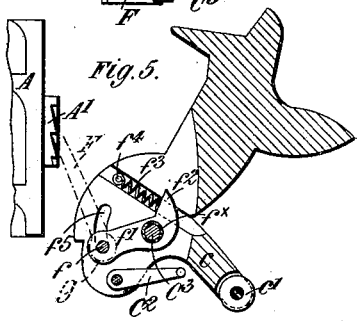
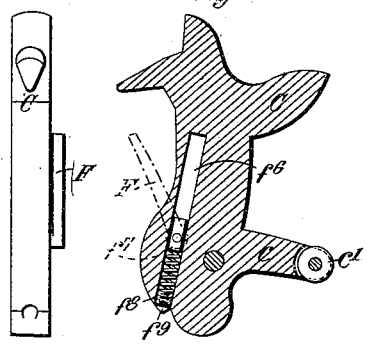
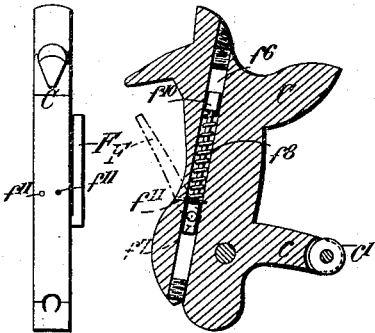
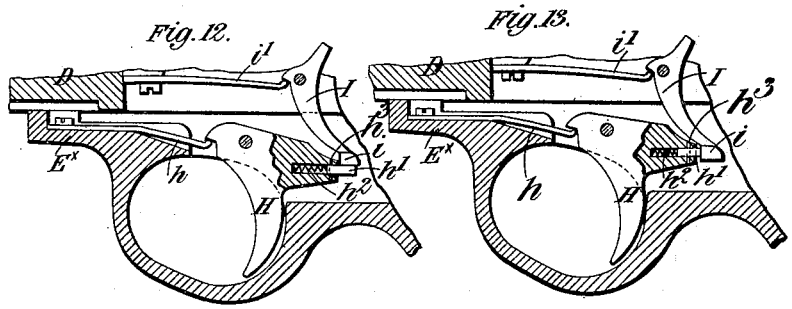
Witnesses.
R. D. Johnston Jr.
Robert Everett
Inventor.
George V. Fosbery.
By James L. Norris
Atty.

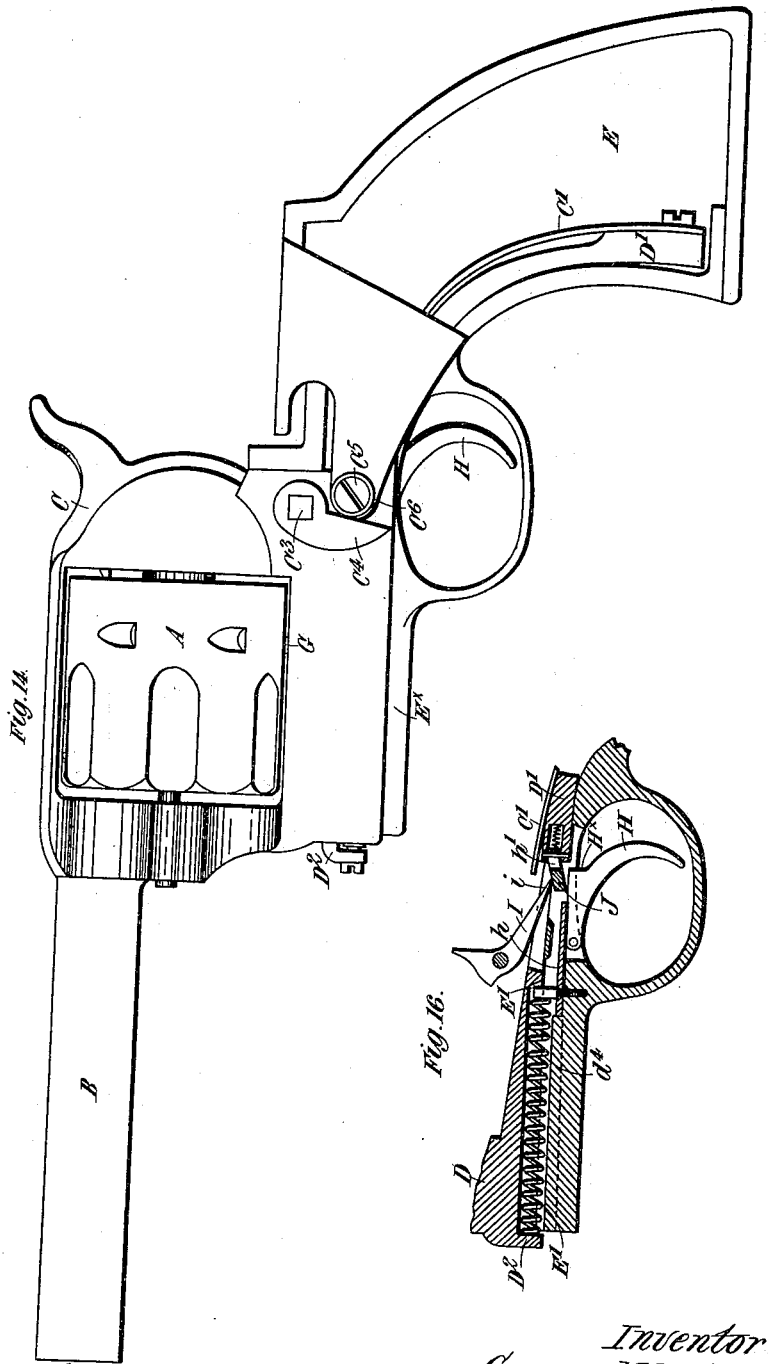

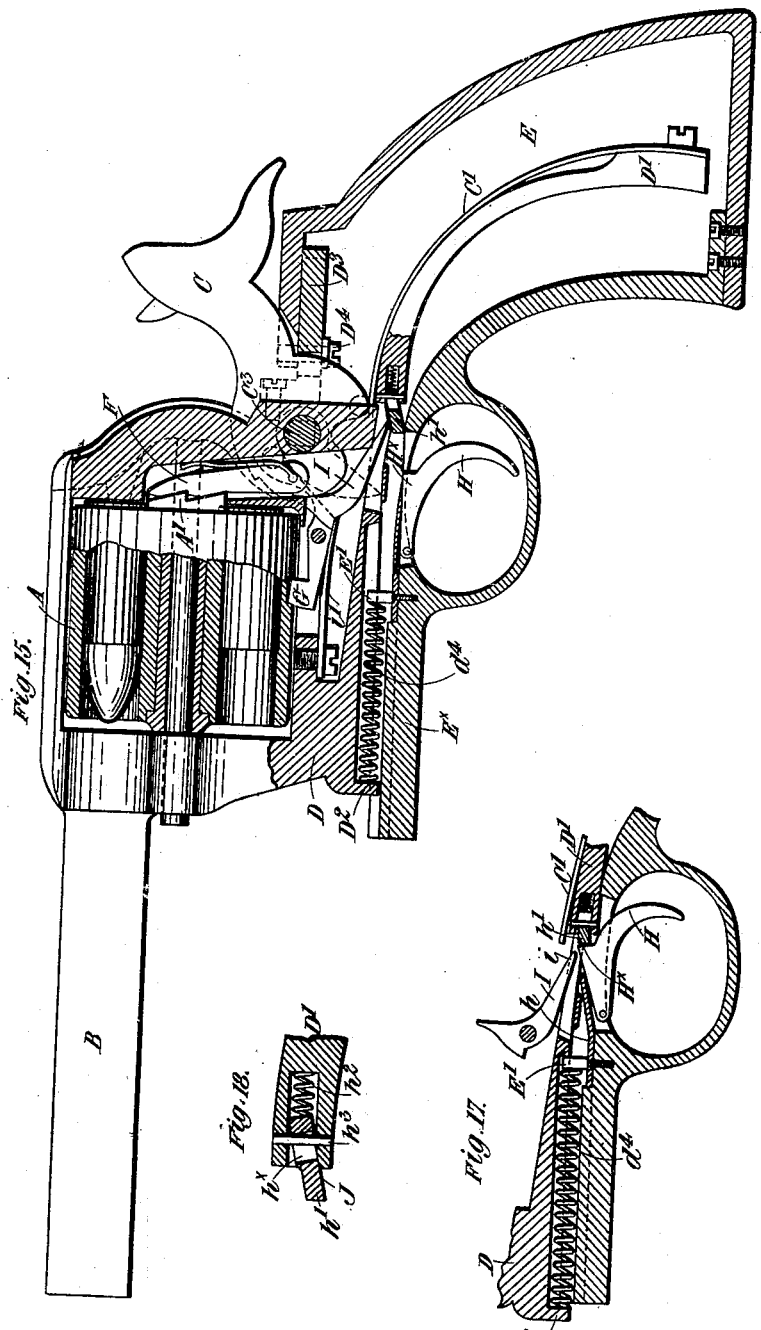
(No Model.) 5 Sheets—Sheet 5.
G. V. FOSBERY.
RECOIL OPERATED FIREARM.
No. 584,631. Patented June 15, 1897.

UNITED STATES PATENT OFFICE.

GEORGE VINCENT FOSBERY, OF LONDON, ENGLAND.

RECOIL-OPERATED FIREARM.

SPECIFICATION forming part of Letters Patent No. 584,631, dated June 15, 1897.

Application filed June 23, 1896. Serial No. 597,060. (No model.)

*To all whom it may concern:*

Be it known that I, GEORGE VINCENT FOSBERY, colonel Victoria Cross, a subject of the Queen of Great Britain, residing at 279 Vauxhall Bridge Road, London, in the county of Middlesex, England, have invented certain new and useful Improvements in Revolvers and other Small-Arms, of which the following is a specification, reference being had to the accompanying drawings.

This invention relates more particularly to that class of pistols or other firearms in which the cartridges are contained in a revolving chambered cylinder which is caused to successively bring the said cartridges in alinement with the barrel by the actuation of the hammer.

It is the chief object of the present invention to so construct pistols of this description that the discharge of one cartridge will automatically cause the hammer to be cocked and a fresh cartridge to be brought into position for firing, so that instead of the user having to exert a strong pull on the trigger for effecting the movement of the entire mechanism, as heretofore, the pull on the trigger is merely required to release the hammer and fire a cartridge.

According to my invention the revolving chambered cylinder, the barrel, and the whole of the breech mechanism excepting the trigger are so mounted on the handle or stock of the weapon that on discharge they all recoil and slide together on the said stock and recock the hammer by bringing a projection thereon against a fixed piece firmly attached to some appropriate part of the stock. These recoiling or sliding parts (hereinafter referred to collectively as the "sliding portion") are returned to their normal position by the reaction of a spring.

In order that my said invention may be fully understood and readily carried into effect, I will proceed to describe the same with reference to the accompanying drawings, in which I have shown my improvements applied to a revolver.

Figure 2:
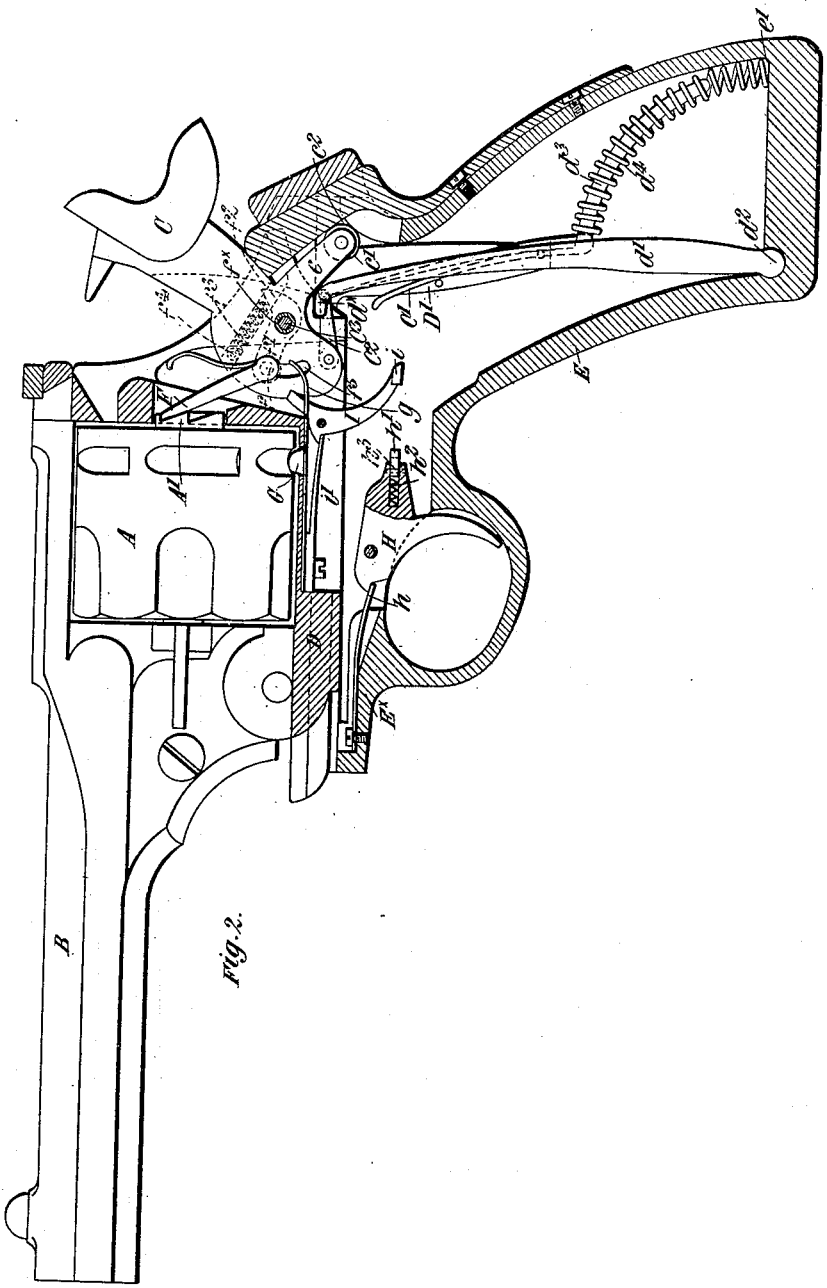

Figure 1 is a side elevation with certain parts in longitudinal section, the sliding portion being in its forward or firing position. Fig. 2 is a similar view, but with the sliding portion in its backward position and the hammer fully cocked. The trigger is here shown in the position it occupies when pulled. Fig. 3 is a fragmentary cross-section taken approximately on the line 1 1 of Fig. 1. Fig. 4 is a central longitudinal section of the hammer, showing more clearly the construction and arrangement of a resilient device which acts in conjunction with the pawl for actuating the cartridge-cylinder, as will be hereinafter fully explained. The hammer is in this figure shown in its "fired" position. Fig. 5 is a similar view, but with the hammer in its "cocked" position. Figs. 6 and 7 are respectively a side elevation and plan view of the resilient device shown in Figs. 4 and 5. Figs. 8 and 9 are respectively a front elevation and a central vertical section of the hammer with a modified construction of the resilient device. Figs. 10 and 11 are similar views showing a further modified construction of the resilient device. Fig. 12 is a fragmentary sectional view showing the trigger and parts in immediate proximity thereto in the position they occupy when the sear has just been released by the trigger. Fig. 13 is a similar view of the same parts in another position. Figs. 14 to 18 illustrate a modified construction of the pistol wherein the spring for returning the sliding portion to its firing position is situated differently, and wherein the cocking of the hammer is effected in a somewhat-modified manner, and wherein the aforesaid spring-stop is carried by the trigger. In these figures, Fig. 14 is a side elevation of the pistol with the sliding portion shown in its forward position. Fig. 15 is a vertical longitudinal section with the parts in the position they occupy at the completion of the recoil movement of the sliding portion. Fig. 16 is a fragmentary sectional view showing the trigger and parts in immediate proximity thereto in the position they occupy when the pistol is ready for firing. Fig. 17 is a similar view showing the parts in another position. Fig. 18 is a detail sectional view of the spring-stop.

Like letters of reference indicate similar parts in all the figures.

A is the revolving cartridge-cylinder; B, the barrel; C, the hammer, and C' the mainspring. All of these parts are carried on a portion D, that is capable of sliding to and fro on the part $E^\times$ of the handle or stock E. The sliding portion of the pistol is provided with longitudinal grooves $d$, into which fit corresponding fins $e$ on the portion $E^\times$. These grooves and fins serve to guide the sliding portion during its rectilinear movements.

Situated within the stock or handle E of the pistol is a lever $d'$, Figs. 1 and 2, whose fulcrum is located at $d^2$, and this lever is furnished with a segmental arm $d^3$, which is surrounded by a spiral spring $d^4$. One end of this spring bears against the aforesaid lever, and the other end lies in the corner $e'$ of the stock, in which position it is retained by the segmental arm. The upper end of the lever $d'$ fits into a notch $d^\times$ in the sliding portion, so that when the latter recoils the lever $d'$ is caused to turn about its fulcrum into the position shown by Fig. 2, whereby the spring $d^4$ is compressed and by its reaction returns the sliding portion to its firing position through the intervention of the lever $d'$.

In Figs. 14 and 15 the coiled spring $d^5$ is located within a longitudinal cavity between the parts D and $E^\times$, one end of the said spring bearing against a projection $D^2$ on the sliding portion D and the other end bearing against a projection $E'$ on the fixed portion $E^\times$.

The mainspring C' is carried by a bar D', depending from the sliding portion and with which it moves. $C^2$, Figs. 1, 2, 4, and 5, is a link connecting the mainspring to the hammer in a manner well understood.

A' is the ordinary ratchet-wheel on the cylinder A, with which the nose of the spring-pawl F engages to turn the said cylinder. I prefer to construct and arrange this pawl in such a manner that the blow that takes place between the said pawl and ratchet-wheel on recoil will be absorbed or cushioned by the compression of a resilient device which in its reaction causes the pawl to operate the cartridge-cylinder. In the construction shown by Figs. 1 to 7 this pawl is pivotally connected by a pin $f$ to a rocking lever $f'$, having a sleeve $f^\times$ loosely mounted on the axle $C^3$ of the hammer. The inner end of the said lever is provided with a tail $f^2$, against which bears one end of a spring $f^3$. The opposite end of the said spring bears against a pin $f^4$, carried by the hammer. The pin $f$ works in a curved slot $f^5$ in the hammer, this slot being an arc of a circle described from the axis about which the lever $f'$ rocks. The said spring $f^3$ exerts sufficient pressure on the tail $f^2$ of the lever $f'$ to cause the latter to keep the pawl in its elevated position, Fig. 4; but when the pistol is fired and the movable portion recoils the hammer, as it assumes its cocking position, brings the nose of the pawl against the teeth of the ratchet-wheel A'. The effect of this movement is not, however, to turn the cylinder A, but to force the pawl downward and turn the lever $f'$ into the position shown by Fig. 5. This movement compresses the spring $f^3$, which therefore absorbs the thrust and acts as a cushion to the pawl, thereby avoiding the percussive action which would otherwise take place between the pawl and the ratchet-wheel A'. The reaction of the aforesaid spring $f^3$ causes the lever $f'$ to resume the position shown in Fig. 4, whereby the pawl operates on the ratchet-wheel A' and turns the cartridge-cylinder A the proper distance to bring a fresh cartridge into firing position. It will be obvious that the strength of the spring $f^3$ must be sufficient to readily turn the cylinder A when fully charged with cartridges.

In Figs. 8 to 11 I have illustrated modified constructions of the resilient pawl F. In each of these examples the hammer is formed with a centrally-arranged cavity $f^6$ for the reception of a sliding block $f^7$, to which the pawl F is pivotally connected.

$f^8$ is a spiral spring which in Figs. 8 and 9 is situated beneath the sliding block and bears against a screw-plug $f^9$ in the lower end of the cavity $f^6$.

In Figs. 10 and 11 the sliding block is provided with a piston $f^{10}$, and pins $f^{11}$ extend across the cavity $f^6$ to serve as a support for the lower end of the spring $f^8$. The upper end of the said spring bears against the lower side of the piston $f^{10}$. In each of these cases the spring $f^8$ serves a similar purpose to that of the spring $f^3$ shown in Figs. 4 and 5—viz., to act as a cushion for absorbing the blow that would otherwise come on the pawl and by its reaction to turn the cartridge-cylinder.

G is the usual stop for locking the cylinder A in the position into which it is set by the aforesaid pawl. In the example of pistol shown in Figs. 1 and 2 this stop is released by the lower or pivotal end of the pawl acting on the extension $g$ of the said stop during the cocking of the hammer and the depression of the said pawl.

I wish it to be understood that I do not confine myself to the specific examples shown for rendering the pawl F resilient, as variations of these examples will readily present themselves to mechanicians of ordinary intelligence.

To effect the cocking of the hammer, it is in Figs. 1 to 13 provided with a rearward extension or arm $c$, having an antifriction-roller $c'$ at its end. Immediately behind this roller is situated an incline $c^2$, which is somewhat curved. When the sliding portion of the pistol recoils, the said roller $c'$ runs on this curved incline and by so doing causes the portion $c$ of the hammer to move downwardly, whereby the hammer is turned about its pivot and fully cocked, and in this position it is retained by the sear I. In Fig. 14 the said hammer is cocked by an arm or lever $C^4$, carried by the axle $C^3$. The free end of the said arm or lever normally lies adjacent to a fixed stud or projection $C^5$, which is furnished with an antifriction-roller $C^6$. In this case each time the pistol is fired the shock of discharge causes the sliding portion to recoil and bring the aforesaid arm or lever $C^4$ against the fixed projection $C^5$, whereby the axle $C^3$ is turned and the hammer fully cocked.

II is the trigger, controlled by a spring $h$, which, when the said trigger is released, keeps it in the position shown in Fig. 1.

In order to prevent the firing of all the cartridges in the cartridge-cylinder in rapid succession when the trigger is once pulled, I so arrange the sear I relatively to the trigger II that the latter cannot act upon the sear to release the hammer unless it is released after each discharge. For this purpose I provide a resilient or spring-pin $h'$, which is carried either by the trigger II, as in Figs. 12 and 13, or by the part $D'$ of the sliding portion D of the pistol, as shown at $h^4$, Figs. 15, 16, 17, and 18. When the said spring-pin is carried by the trigger, the latter is provided with a recess for the reception of the spring-pin, which is normally retained in an outward position by a light spring $h^2$. The extent to which the spring-pin can project is limited by a transverse pin $h^3$, passing through a slot $h^\times$ in the said spring-pin.

When the hammer is cocked and the trigger is pulled to discharge a cartridge, the aforesaid spring-pin $h'$ acts on an enlargement $i$ on the tail of the sear I, thereby tripping the sear, Fig. 12, and releasing the hammer. If the trigger be not then released by the user, but be still held in the position shown in Fig. 2, the aforesaid enlargement $i$ on the sear will, as the recoiling part of the pistol again resumes its firing position, come against the spring-pin $h'$. The sear will not, however, be operated thereby, because the spring controlling the pin is, as already stated, only a light one and therefore does not offer sufficient resistance to turn the sear against the superior strength of the sear-spring $i'$. The parts therefore occupy the position shown by Fig. 13, and it will be evident that so long as they are in this position the pistol cannot be fired. Immediately, however, the trigger is released and allowed to assume the position shown in Fig. 1 the aforesaid spring-pin is again projected from its recess by its spring, and consequently if the trigger be then again pulled this spring-pin will come beneath the enlargement on the sear, as shown in Fig. 12, and fire the pistol. When the said spring-pin is carried by the piece $D'$, it occupies such a position that it is capable of coming between the trigger and the tail of the sear I, as shown at Fig. 16, when the trigger is released. The mouth of the aforesaid recess is somewhat enlarged to permit of the spring-pin moving vertically as well as longitudinally.

When the hammer is cocked and the pistol ready for firing, the aforesaid pin $h^4$ will occupy the position represented in Fig. 16, and consequently if the trigger be now pulled the pin will be raised and cause the sear I to release the hammer and fire a cartridge. The sliding portion of the pistol will then recoil, fully cocking the hammer, as already stated, and will afterward return to its firing position under the action of the spring $d^5$; but if the trigger has not been previously released by the operator—that is to say, if it still occupies the position represented in Fig. 17—the pin $h^4$ will collide with the shoulder II$^\times$ of the trigger and will thereby be forced longitudinally into its recess, so as to be incapable of coming between the trigger and the sear I, Fig. 17. The trigger cannot, therefore, reach the sear to operate it, and consequently the pistol cannot be discharged. Immediately, however, the trigger is released the shoulder II$^\times$ moves out of the path of the pin $h^4$ and allows the latter to move forward under the influence of its spring and to assume a position above the trigger, as represented in Fig. 16. The pistol can therefore be fired when the trigger is next pulled.

What I claim is—

1. In a small-arm, the combination with the stock, of a sliding portion mounted thereon, a barrel, revolving cartridge-cylinder, pivoted hammer and cylinder-actuating mechanism carried by said sliding portion, an arm on said hammer, and a projection on the stock arranged in the path of said arm, whereby when the sliding portion recoils said arm strikes the projection and the hammer is thereby cocked and the cylinder partially rotated to bring a fresh cartridge into alinement with the barrel, substantially as described.

2. In a small-arm having a revolving cartridge-cylinder operated by the cocking of the hammer, the combination with a spring-controlled sliding portion comprising the barrel, the cartridge-cylinder and the hammer and with a stationary portion comprising the stock and the trigger; of a rearwardly-projecting arm on the hammer and of a fixed inclined projection mounted on the stock and situated at the rear of the aforesaid rearwardly-projecting arm substantially as described and for the purpose specified.

3. In a small-arm having a revolving cartridge-cylinder operated by the cocking of the hammer, the combination with a sliding portion comprising the barrel, the cartridge-cylinder and the hammer, of a stationary portion comprising the stock and the trigger, a rearwardly-projecting arm on the hammer, a fixed inclined projection mounted on the stock in the rear of the rearwardly-projecting arm, an oscillatory lever engaging the said sliding portion, and a spring operating to force said oscillatory lever and sliding portion to their forward or firing position, substantially as described.

4. In a small-arm having a revolving cartridge-cylinder operated by the cocking of the hammer, the combination with the sliding and stationary portions of an oscillatory lever whose lower end has a fulcrum within the stock and whose upper end engages with the said sliding portion; of a bent arm on the said lever, and of a spiral spring surrounding the said bent arm and normally acting to keep the said lever and the sliding portion in their forward or firing position substantially as described.

5. In a small-arm having a recoiling portion carrying a barrel, a hammer and a revolving cartridge-cylinder operated by the cocking of the hammer, the combination with the hammer and a driving-pawl operating to turn the cartridge-cylinder, of a spring arranged to absorb the thrust of the pawl caused by the recoil and react to cause the pawl to rotate the cylinder, substantially as described.

6. In a small-arm having a revolving cartridge-cylinder operated by the cocking of the hammer, the combination with the hammer of a sliding piece carrying the driving-pawl, and of a spring which acts to absorb the blow on the nose of the said driving-pawl, and which by its reaction causes the rotary movement of the cartridge-cylinder substantially as described.

7. In a small-arm having a revolving cartridge-cylinder operated by the cocking of the hammer, the combination with the hammer of a sliding piece to which the driving-pawl is pivotally connected; of a lever pivoted to the hammer and connected at one end to the aforesaid sliding piece; and of a spring which bears against the free extremity of the said pivoted lever, whereby the said lever acting under the influence of its spring normally keeps the driving-pawl in an elevated position substantially as described and for the purpose specified.

8. In a small-arm having a revolving cartridge-cylinder operated by the cocking of the hammer, the combination with the hammer, of a sliding piece consisting of a transverse pin working in curved slots in the hammer; of a driving-pawl pivotally mounted on said sliding piece; of a lever carrying the said transverse pin and located within a bifurcated portion of the hammer and loosely mounted on the hammer-axle; of a tailpiece on the free end of the said lever; and of a spiral spring situated within the bifurcated portion of the hammer and bearing at one end against a fixed stop on the hammer and at the other end against the tailpiece on the said lever; all substantially as described and for the purpose specified.

9. In a small-arm the combination of a sliding portion which recoils on discharge and automatically cocks the hammer, of the trigger and the sear, a spring-controlled pin situated in a recess formed in the said sliding portion and adapted to come between the tail of the firing-sear and the leaf of the trigger when the firearm is ready for firing but is prevented from assuming this position if the trigger be still pulled during the return of the sliding portion to the firing position, substantially as described and for the purpose specified.

In testimony whereof I have hereunto set my hand this 4th day of June, 1896.

GEORGE VINCENT FOSBERY.

Witnesses:
ARTHUR A. BERGIN,
WM. MELLENTS JACKSON.